Feb. 10, 1959  H. F. MARKER  2,873,154
PISTON PACKING RINGS AND METHOD OF PRODUCING SAME
Filed Jan. 4, 1954

INVENTOR.
HAROLD F. MARKER
BY
ATTORNEY

United States Patent Office 2,873,154
Patented Feb. 10, 1959

2,873,154

PISTON PACKING RINGS AND METHOD OF PRODUCING SAME

Harold F. Marker, Charleston, Ill.

Application January 4, 1954, Serial No. 402,012

16 Claims. (Cl. 309—29)

This invention relates in general to piston packing rings and, more particularly, to rapid seating hard chromium-plated rings and methods for producing same.

In recent years, the expedient of hard chromium-plating of piston packing rings for use in internal combustion engines has been limitedly adopted. The wear and corrosion resistant and the low coefficient of friction properties of chromium renders same highly desirable for application on piston rings. However, experience has generally demonstrated that the hardness of the chromium delays for prolonged periods the proper seating or formation of a tight joint with the cylinder wall of such rings. In automobiles, it has been customarily necessary to operate same from 4,000 to 5,000 miles before hard chromium-plated rings are worn into complementary conformity to the cylinder wall with development of compression approaching values requisite for efficient engine performance and with substantial reduction in the attendant excessive oil consumption. The failure of hard chromium-plated piston rings to seat reasonably quickly has counteracted in great measure the desirable characteristic of such rings, as long wear and the like, and has thus materially militated against their wide acceptance in the automotive industry. Furthermore, as hard chrome is not machineable the plating thereof must be ground or lapped, which process adds markedly to the cost of producing such rings.

Therefore, it is an object of the present invention to provide a hard chromium-plated piston packing ring for internal combustion engines which is adapted for rapid seating for development of high compression early in the wearing-in period.

Another object of this invention is to provide a hard chromium-plated piston packing ring having an exterior coating which obviates the necessity of costly surface finishing, such as lapping or grinding.

A further object is to provide a piston packing ring which is inexpensively produced; reliable and highly durable in usage, being wear and corrosion resistant; and conducive to economical and efficient engine performance.

Another object is to provide a process for producing a hard chromium-plated piston packing ring which is adapted for relatively rapid seating.

An additional object is to provide a process for effectively positively adhering an outer or wearing layer of relatively soft metal to a hard chromium-plated piston ring.

A further object is to provide a process for the stated purpose which may be economically accomplished.

These and other detailed objects are obtained by the structure illustrated in the accompanying drawing in which.

Figure 1:
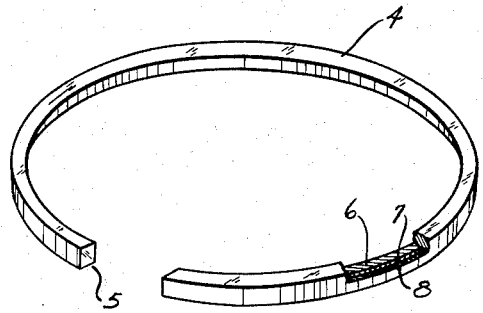
Figure 1 is a perspective view of a piston ring constructed in accordance with and embodying the present invention, wherein the ring is shown in partial circumferential section.
Figure 2:
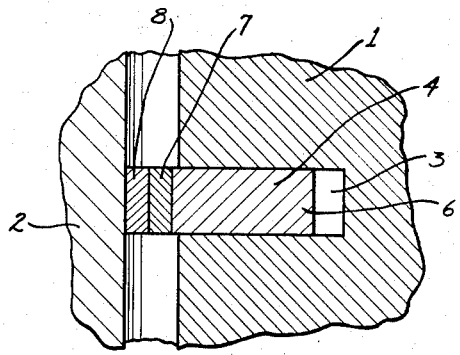
Figure 2 is a fragmentary vertical section illustrating the piston ring of the present invention in initial or unseated relation with respect to the wall of a cylinder of an internal combustion engine.
Figure 3:
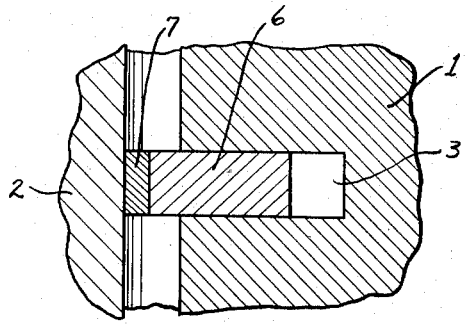
Figure 3 is a fragmentary vertical section illustrating the ring in seated position.

The present invention is generally concerned with the provision of a piston packing ring comprising in intimate union an inner or main portion, as of cast iron, an intermediate portion of hard chrome, and an outer or wearing portion of relatively soft metal, and methods for producing a ring of such construction.

In the drawing, 1 represents the piston of an internal combustion engine and 2 the cylinder. The piston would commonly be provided with a plurality of piston ring grooves but only one groove 3 is illustrated, this being preferably a compression ring groove for receiving a piston packing ring 4, which may have any suitable type joint but is shown in the drawing as having a butt joint 5. Piston ring 4 integrally embodies an inner or base, resilient, annular portion 6 commonly and preferably formed of cast iron, which is plated throughout its circumferential surface with a uniform layer of hard chromium 7, which may have any desirable radial thickness, as in the range .0005 to .004 inch, but in practice a dimension of .002 inch has been found satisfactory. Such chromium is relatively hard, having a Vickers rating of 800 and above and a Knoop hardness in the range of 800–1050. Bonded, or otherwise intimately applied, upon the outer surface of chromium layer 7 is a film or coating of relatively soft metal 8 which is presented for frictional contact with the cylinder wall, and may have a radial dimension also in the neighborhood of .002 inch, but such is not to be considered specific as other thicknesses are equally adequate. The metal forming such outer coating has a Knoop or Brinell rating of 300 to 600 and, hence, under friction will relatively rapidly wear down.

When ring 4 is applied to cylinder 2 it will not precisely conform to the wall or face thereof. Normally ring 4 would contact cylinder 2 at separated points because of surface irregularities. Hence, the more quickly ring 4 "seats," that is, conforms to the cylinder wall, the more the compression loss will be reduced. Since hard chrome is highly wear-resistant, a prolonged wear-in period would normally be requisite for seating. The soft metal outer coating 8 serves to seal the compression until the hard chrome layer can conform to the cylinder wall. Outer layer 8 will wear away relatively rapidly through engagement with cylinder wall 2 and thus permit the rapid formation of a tight joint between piston ring 4 and cylinder 2. Thus, the customary breaking-in period expected with hard chrome plated rings is materially reduced.

As the soft metal 8 continues to wear away, the high spots or projections on cylinder wall 2 come into contact with the much harder underlying surface of hard chrome 7 on ring 4. At the end of a preliminary period, ring 4 will present a bearing or outer surface which is composed partly of soft metal 8 and partly of hard chrome 7. Upon further operation, a reverse situation will develop in which the wearing away of the surface of piston ring 4 substantially terminates and, from this point on, the wall of cylinder 2 gradually assumes a form complementary to the shape of ring 4. However, during the transition process, conformity of the convex outer surface of ring 4 and the concave inner surface of cylinder 2 is maintained and the engine continues marked efficient operation. Eventually, all soft metal 8 will be worn away and completely hard chrome surface 7 will be in contact with cylinder wall 2. Maximum efficiency (minimum friction) of operation will then have been reached and due to the long wearing properties of hard chrome any engine will have longer life at greater efficiency. The softness of the metal forming the outer cylinder-engaging coating 8 eliminates danger of scuffing during the wear-in period and thereby increases the life of ring 4 and reduces wear on cylinder 2.

The wearing away of the periphery of the ring results in a slight expansion of the ring and a slight widening of the gap at the butt joint 5 of the ring. However, there is only a very slight increase in the width of the gap, for the thickness of the film of soft metal is such that the soft metal can be worn away without materially changing the width of the gap at the butt joint 5 of the ring.

To produce a piston packing ring of the present invention there are several effective methods which may be utilized and numerous metals of desired properties which may be applied upon the hard chrome layer. Since in the manufacture of piston rings close observance must be accorded cost factors, certain procedures are more competitively attractive than others. One such procedure which may be economically performed is as follows: a split annular member of suitable stock, such as cast iron, is provided, thoroughly cleaned, and then hard chromium plated. The deposit of the hard chrome may be effected by well known standard electroplating processes such as utilizing a chromium bath having a chromic-sulfuric acid ratio of about 100:1 and a temperature preferably of 125° F. with a current density of 1 to 1.5 amperes per square inch of surface. A thermal range of 100° to 150° has been found effective with a current density varying directly with the temperature. Under the aforesaid conditions chromium deposits at a rate of about .001 inch per hour so that approximately two hours is requisite to electrodeposit the preferred .002 inch plating. The chrome so deposited is hard, having a Knoop rating or Vickers hardness of 800–1050. The plated ring thus formed is identical with the chromium rings heretofore used, and which have required wear-in periods of extensive duration. To apply a layer of wearing metal to the hard chrome, the current in the chromium bath is turned off and the temperature thereof elevated to about 175° F. The current flow is then regenerated and maintained at a rate between 2.5 and 7 amperes per square inch of surface. The chromium so deposited under these conditions will be relatively soft, having a Knoop or Brinell hardness of 300–600. Since the rate of deposition of the soft chrome is about the same as the hard chrome, approximately two hours will be needed to develop an .002 inch of soft chrome coating. The soft chrome so deposited is machineable whereas the underlying hard chrome can not be machined. The intimate application of the exterior soft chrome layer does not in any way affect the hard chrome intermediate portion of ring 4.

Since the outer soft chrome layer is presented for wearing, frictional engagement with the cylinder wall, there is no necessity for lapping or grinding thereof, as is involved in the production of rings having a hard chrome exterior surface. Consequently, a decided cost saving may be effected.

Piston rings produced by the above described method were installed in various types of used automobiles wherein the surface irregularities of the cylinder would be expectedly most developed and the performance of such rings therein closely checked. By determination of the compression gain, these tests revealed that seating was accomplished in approximately 500 miles of engine operation which is a substantial reduction over the 1000 miles of operation normally required for seating of cast iron piston rings, and the 4000–5000 miles requisite for seating of exteriorly hard chrome-plated rings.

Other metals having a softness comparable to that of soft chrome may be used, such as copper, silver, zinc, cadmium, aluminum, iron, tin, lead, and various alloys thereof including, among others, brass, bronze, and Babbitt metal. The bonding of such metals to the hard chrome necessitates various processes such as brazing, soldering, galvanizing, and spinning, in addition to electroplating, as above indicated. The soldering of silver and the brazing of copper alloys on the hard chrome are examples of such other methods. However, from a production standpoint, such are not as economical as the electrodeposition of soft chrome, since the control of the radial thickness of the outer coating is difficult to attain.

The details of construction can be varied and modifications and changes may be made and substituted in the steps of the methods herein shown without departing from the spirit of the invention and the exclusive use of those modifications coming within the scope of the claims contemplated.

What I claim and desire to secure by Letters Patent is:

1. A piston packing ring comprising an inner, an intermediate, and an outer portion, said intermediate portion being of a different substance than said inner portion and of greater hardness than said inner and outer portions.

2. A metallic piston packing ring comprising intimately united inner, intermediate, and outer portions, said intermediate portion being of a different metal than said inner portion of greater hardness than said inner and outer portions, said outer portion being relatively soft.

3. A piston packing ring comprising inner, intermediate, and outer portions, said intermediate portion being of chromium.

4. A piston packing ring comprising an inner chromium portion, and an outer portion of relatively soft, quick wearing material.

5. A piston packing ring comprising an inner annular chromium portion, and an outer annular portion of relatively soft quick wearing material intimately united with said chromium portion.

6. A piston packing ring comprising an inner and an outer annular chromium portion, said outer chromium portion being of less hardness than said inner chromium portion.

7. A piston packing ring comprising an inner portion of chromium having a Knoop hardness rating of 800 or above, and an outer metallic portion united to said chromium portion and having a Knoop hardness rating of 300 to 600.

8. A piston packing ring comprising an inner annular portion of cast iron, an intermediate chromium portion, and an outer annular portion of a metal of less hardness than said chromium.

9. A piston packing ring comprising an inner annular portion of cast iron, an intermediate hard chromium portion, and an outer annular portion of soft chromium.

10. A piston packing ring comprising an inner annular metallic portion, an intermediate chromium portion having a Knoop hardness rating of 800 or above, and an outer metallic portion united to said intermediate chromium portion and having a Knoop hardness rating of 300 to 600.

11. A piston packing ring comprising an inner annular metallic portion, an intermediate chromium portion having a Knoop hardness rating of 800 or above, and an outer chromium portion united to said intermediate chromium portion and having a Knoop hardness rating of 300 to 600.

12. A piston packing ring comprising an inner annular cast iron portion, an intermediate chromium portion having a Knoop hardness rating of 800 or above, and an outer chromium portion united to said intermediate chromium portion and having a Knoop hardness rating of 300 to 600.

13. A piston packing ring as described in claim 5 wherein the relatively soft quick wearing material is copper.

14. A piston packing ring as described in claim 5 wherein the relatively soft quick wearing material is aluminum.

15. A piston packing ring as described in claim 5 wherein the relatively soft quick wearing material is cadmium.

16. A piston packing ring as described in claim 5 wherein the relatively soft quick wearing material is tin.

References Cited in the file of this patent

UNITED STATES PATENTS

| | | |
|---|---|---|
| 2,313,395 | Phillips | Mar. 9, 1943 |
| 2,330,635 | Siebel | Sept. 28, 1943 |
| 2,487,587 | Phillips | Nov. 8, 1949 |
| 2,702,785 | Eyerund | Feb. 22, 1955 |

FOREIGN PATENTS

| | | |
|---|---|---|
| 840,101 | France | Apr. 19, 1939 |
| 568,161 | Great Britain | Mar. 21, 1945 |
| 502,264 | Belgium | Apr. 14, 1951 |